(12) United States Patent
Gao et al.

(10) Patent No.: US 8,060,456 B2
(45) Date of Patent: Nov. 15, 2011

(54) TRAINING A SEARCH RESULT RANKER WITH AUTOMATICALLY-GENERATED SAMPLES

(75) Inventors: Jianfeng Gao, Kirkland, WA (US); Kuansan Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 626 days.

(21) Appl. No.: 12/243,359

(22) Filed: Oct. 1, 2008

(65) Prior Publication Data

US 2010/0082510 A1 Apr. 1, 2010

(51) Int. Cl.
*G06F 15/16* (2006.01)
(52) U.S. Cl. .......................................... 706/12
(58) Field of Classification Search ............... 706/12
See application file for complete search history.

(56) References Cited

U.S. PATENT DOCUMENTS

| | | | |
|---|---|---|---|
| 6,665,836 B1 | 12/2003 | Wynblatt et al. | |
| 7,593,934 B2* | 9/2009 | Li et al. ................................. | 1/1 |
| 7,689,615 B2* | 3/2010 | Burges et al. ................. | 707/723 |
| 7,779,019 B2* | 8/2010 | Burges .......................... | 707/758 |
| 7,908,234 B2* | 3/2011 | Shao et al. ...................... | 706/21 |
| 7,966,309 B2* | 6/2011 | Shacham et al. .............. | 707/708 |
| 7,966,321 B2* | 6/2011 | Wolosin et al. ............... | 707/728 |
| 2007/0094234 A1 | 4/2007 | Wen et al. | |
| 2007/0208730 A1 | 9/2007 | Agichtein et al. | |
| 2007/0239702 A1 | 10/2007 | Vassilvitskii et al. | |
| 2007/0255689 A1 | 11/2007 | Sun et al. | |

OTHER PUBLICATIONS

A fast stochastic parser for determining phrase boundaries for text-to-speech synthesis, Sharman, R.A.; Wright, J.H.; Acoustics, Speech, and Signal Processing, 1996. ICASSP-96. Conference Proceedings., 1996 IEEE International Conference on vol. 1 Digital Object Identifier: 10.1109/ICASSP.1996.541106 Publication Year: 1996 , pp. 357-360.*
Constructing Grading Information System for Words' Difficulty using a Supervised Learning Method, Chir-Ho Chang; Hung-Jwun Liu; Jin-Ling Lin; Machine Learning and Cybernetics, 2007 International Conference on vol. 7 Digital Object Identifier: 10.1109/ICMLC.2007.4370844 Publication Year: 2007 , pp. 3991-3996.*
Evolutionary algorithm for noun phrase detection in natural language processing, Serrano, J.I.; Araujo, L.; Evolutionary Computation, 2005. The 2005 IEEE Congress on vol. 1 Digital Object Identifier: 10.1109/CEC.2005.1554743 Publication Year: 2005 , pp. 640-647 vol. 1.*
Efficient Syntactic Parsing with Beam Search, Huong Thanh Le; Lam Ba Do; Nhung Thi Pham; Computing and Communication Technologies, Research, Innovation, and Vision for the Future (RIVF), 2010 IEEE RIVF International Conference on Digital Object Identifier: 10.1109/RIVF.2010.5633334 Publication Year: 2010 , pp. 1-6.*

(Continued)

*Primary Examiner* — Michael B Holmes

(57) ABSTRACT

A search result ranker may be trained with automatically-generated samples. In an example embodiment, user interests are inferred from user interactions with search results for a particular query so as to determine respective relevance scores associated with respective query-identifier pairs of the search results. Query-identifier-relevance score triplets are formulated from the respective relevance scores associated with the respective query-identifier pairs. The query-identifier-relevance score triplets are submitted as training samples to a search result ranker. The search result ranker is trained as a learning machine with multiple training samples of the query-identifier-relevance score triplets.

20 Claims, 6 Drawing Sheets

OTHER PUBLICATIONS

Agichtein, et al., "Identifying "Best Bet" Web Search Results by Mining Past User Behavior", Proceedings of the 12th ACM SIGKDD international conference on Knowledge discovery and data mining, Philadelphia, Pennsylvania, USA, 2006, pp. 902-908.

Montague, et al., "Relevance Score Normalization for Metasearch", Proceedings of the tenth international conference on Information and knowledge management, Atlanta, Georgia, USA, 2001, pp. 427-433.

Huang, et al., "Relevant Term Suggestion in Interactive Web Search Based on Contextual Information in Query Session Logs", Journal of the American Society for Information Science and Technology, vol. 54, Issue 7, May 2003, pp. 638-649.

Coyle, et al., "Supporting Intelligent Web Search", ACM Transactions on Internet Technology (TOIT), vol. 7, Issue 4, Article No. 20, Oct. 2007, 40 pages.

Li, et al., "Learning to Rank Using Classification and Gradient Boosting", In NIPS, 2007, 10 pages.

Huang, et al., "Clustering Similar Query Sessions Toward Interactive Web Search", Proceedings of Research on Computational Linguistics Conference XIII (ROCLING XIII), Taipei, Taiwan, Aug. 2000, 21 Pages.

* cited by examiner

TRAINING A SEARCH RESULT RANKER WITH AUTOMATICALLY-GENERATED SAMPLES

BACKGROUND

The amount of information being created and retained in the world continues to increase, seemingly at a geometric pace. Individuals take photographs and store them digitally. Corporations maintain databases of reports, presentations, and analyses. Furthermore, different entities of all types are making much of their information available via the Internet.

Although so much of the world's information is now accessible over the Internet, locating a desired item manually is extraordinarily difficult. Instead, search engines are usually used to find information generally and desired items specifically. Search engines review available information, which is a process often termed crawling with regard to the World Wide Web (WWW), to catalog the information into a search index.

A search index facilitates the acquisition of information generally and desired items specifically in an accurate and timely manner. Thus, a search index enables a search engine to locate information that may be of interest to a user. However, there is so much information today that many, many items may be located by a search engine. In the case of the internet, thousands, or even hundreds of thousands or more of such items may be relevant or may appear to be relevant to a user's interest as expressed in a search query.

An issue for search engines therefore becomes one of ranking the relevant items. The items are hopefully ranked such that more relevant items are ranked higher than less relevant ones. Many search engines are now relatively proficient at finding items that are potentially relevant to a user's expressed interest. Unfortunately, search engines still often fail to rank relevant items in accordance with a user's level of interest in them. Especially when many potentially relevant items are located by a search engine, the inability to properly rank them can be disappointing and dissatisfying to users.

SUMMARY

A search result ranker may be trained with automatically-generated samples. In an example embodiment, user interests are inferred from user interactions with search results for a particular query so as to determine respective relevance scores associated with respective query-identifier pairs of the search results. Query-identifier-relevance score triplets are formulated from the respective relevance scores associated with the respective query-identifier pairs. The query-identifier-relevance score triplets are submitted as training samples to a search result ranker. The search result ranker is trained as a learning machine with multiple training samples of the query-identifier-relevance score triplets.

In another example embodiment, a system is capable of training a search result ranker. The system includes: a relevance score determiner, a training sample handler, and a search result ranker. The relevance score determiner infers user interests from user interactions with search results for a particular query and determines respective relevance scores associated with respective query-identifier pairs of the search results. The training sample handler formulates query-identifier-relevance score triplets from the respective relevance scores associated with the respective query-identifier pairs and submits the query-identifier-relevance score triplets as training samples to a learning machine. The search result ranker is trained as the learning machine with multiple training samples of the query-identifier-relevance score triplets.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other systems, methods, devices, media, apparatuses, arrangements, and other example embodiments are described herein.

BRIEF DESCRIPTION OF THE DRAWINGS

The same numbers are used throughout the drawings to reference like and/or corresponding aspects, features, and components.

DETAILED DESCRIPTION

As explained herein above, search engines often fail to rank relevant items in accordance with a user's actual level of interest in them. In other words, existing approaches to the ranking of search results are inadequate. One type of search results ranker that can potentially produce good rankings is a learned ranker. Learned rankers, however, are usually trained on a great many labeled samples before their ranked output is of a sufficiently high quality. Unfortunately, acquiring manually-labeled samples is expensive. Moreover, it is difficult to achieve in the short term on a constant basis.

In contrast with existing approaches, for example embodiments that are described herein, a large number of training samples may be generated automatically from, e.g., query session logs. A search results ranker may then be trained by applying such automatically acquired samples to a learning machine model. More specifically, user interactions with search results may be monitored and used to infer relevance judgments from the users. These inferred relevance judgments are transformed into estimated relevance scores and used as part of the training samples.

By way of specific example, one or more processor-accessible tangible media include processor-executable instructions for training a search result ranker. The processor-executable instructions, when executed, direct a system to perform the following acts. User interests are inferred from user interactions with the search results for a particular query, with the search results including identifiers that are uniform resource locators (URL). Respective relevance scores that are associated with respective query-identifier pairs of the search results are determined. Each respective relevance score is a respective probability of the respective identifier being skipped by a user.

Query-identifier-relevance score triplets are formulated from the respective relevance scores that are associated with the respective query-identifier pairs. The query-identifier-relevance score triplets are submitted as training samples to a search result ranker. The search result ranker is trained as a learning machine with multiple training samples comprising the query-identifier-relevance score triplets.

In an example implementation, the user interactions may be one or more of: an identifier selection, the dwell time on an item corresponding to a selected identifier, the viewing of an identifier of a search result, the skipping of an identifier of a search result, combinations thereof, and so forth. In another example implementation, the acts of inferring and determining may entail automatically determining relevance scores from the user interactions without manual label relevance input from the users. These example aspects are described further herein below, and additional example embodiments and implementations are also described further herein below.

Figure 1:
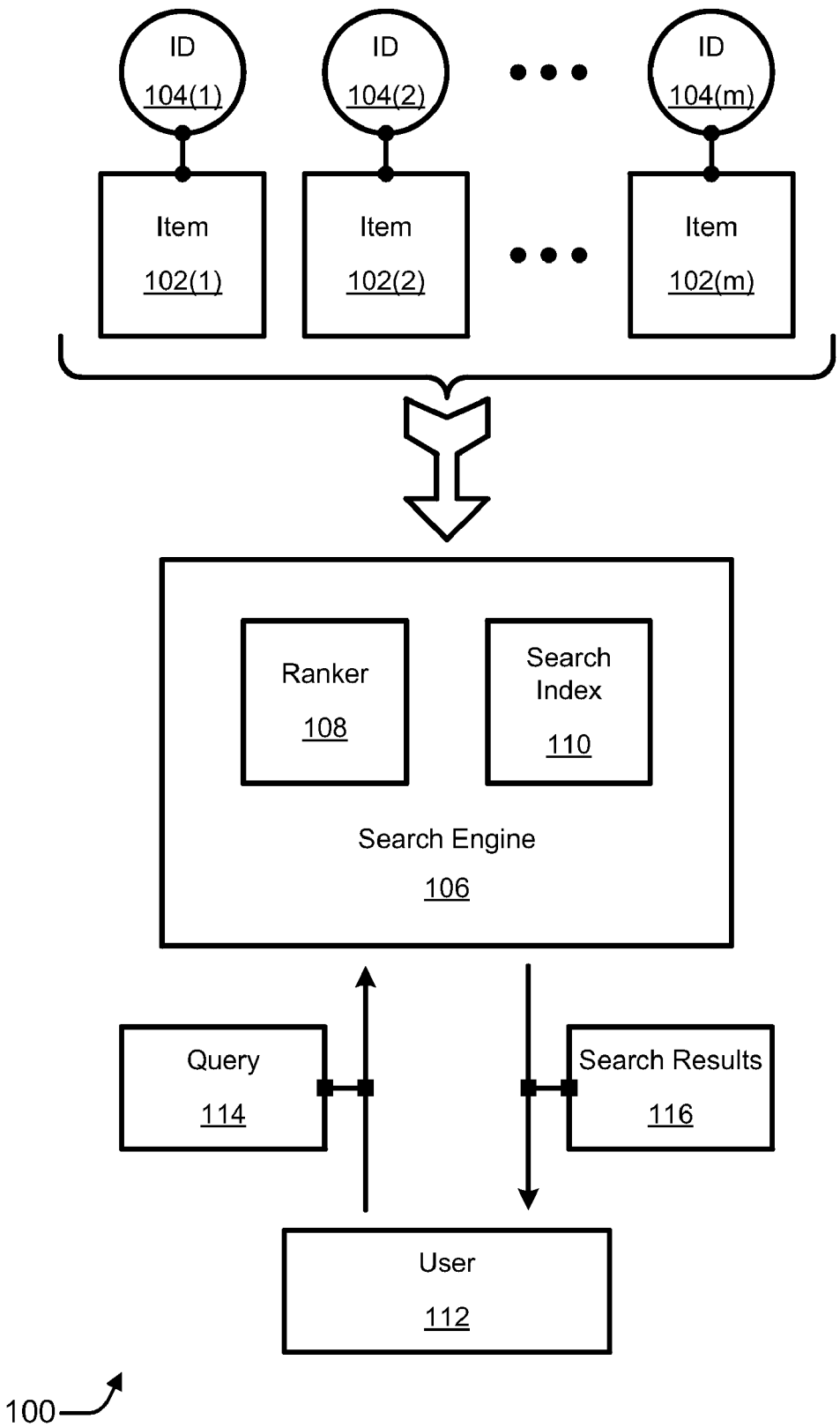
FIG. 1 illustrates an example general search paradigm.

FIG. 1 illustrates an example general search paradigm 100. As illustrated, search paradigm 100 includes multiple items 102, multiple identifiers 104, a search engine 106, and a user 112. More specifically, "m" items 102(1), 102(2) ... 102(m) and identifiers 104(1), 104(2) ... 104(m) are shown, with "m" representing a positive integer. Search engine 106 includes one or more rankers 108 and at least one search index 110. In an example operation of search paradigm 100, user 112 sends or submits a query 114 to search engine 106. In response, search engine 106 transmits or returns a set of search results 116.

For example embodiments, each respective item 102 corresponds to a respective identifier (ID) 104. An item 102 may be, for example, a file generally, a document, a spreadsheet, an image, a public document format (PDF) file, an audio file, a video, some combination thereof, and so forth. The respective corresponding identifier 104 represents the respective item 102. Each identifier 104 may be, for example, a name, an address, a file path, some combination thereof, and so forth. For instance, with regard to the internet, an item 102 may be a web page, and an identifier 104 may be a URL. Additional example aspects for an identifier 104 when displayed as part of a search results listing are described herein below with particular reference to FIG. 3.

To prepare for providing a search on items 102, search engine 106 accesses and reviews items 102. The review enables search engine 106 to catalog items 102 into search index 110. Search index 110 facilitates finding relevant items 102 relatively quickly during searches. Ranker 108 is a component that enables relevant items 102 to be ranked, hopefully in a manner that reflects the interests of user 112. Example attributes of heuristic rankers and of learned rankers are described below.

In an example operation, a user 112 submits query 114 to search engine 106. Typically, query 114 includes one or more words (including characters for languages based thereon). However, query 114 may include other content, such as images or sounds. Search engine 106 performs a search for query 114 with reference to search index 110 to retrieve a set of search results of items 102 (e.g., as represented by their corresponding identifiers 104). The search usually retrieves many items 102.

These many items 102 are then ranked by one or more rankers 108. The intention of a ranker 108 is to order the search results in accordance with the actual interests of a user 112. Different categories of rankers 108 operate differently when ranking search results. Generally, the ranking entails ordering a set of returned identifiers 104 for a query 114 in such a way that relevant identifiers 104 are ranked higher than less relevant ones, which are ranked higher than irrelevant ones.

The interests of user 112, which guide which items 102 the user considers more or most relevant, usually have to be derived. They can be derived from many sources. Example sources include, but are not limited to, the content of query 114, the content of items 102, the content of identifiers 104, popular trends, personal and global search histories, combinations thereof, and so forth. The ranked list of search results 116 is then returned to user 112.

Many possible usage scenarios are applicable to search paradigm 100. For example, user 112 may directly interact with a client device, and search engine 106 may be functioning on a server device. Thus, user 112 may enter query 114 at a client device. Query 114 is then sent to the server device over one or more networks (including, e.g., the internet). A search operation is performed at the server device by search engine 106. The search operation may include locating items that are relevant to query 114 and ranking the located items in accordance with relevance scores (e.g., for query-identifier pairs). Search results 116 as ranked by relevance are transmitted from the server device to the client device via the network(s). User 112 may then access search results 116 at the client device.

It should be understood that the search result ranker training principles described herein are applicable to many different usage scenarios in addition to the one described above. For example, search engine 106 may be distributed across multiple devices (e.g., multiple server devices). Also, a local network (e.g., a local area network (LAN), wireless LAN (WLAN), etc.) may be used instead of or in addition to the internet. Moreover, a user 112 may alternatively interact "directly" with search engine 106 (e.g., at a server, client, or other device). Additionally, search engine 106 may be for local searches by targeting relatively local items. In such a local scenario, the search services may be for desktop search (e.g., as part of an operating system or other application), may be for a database search (e.g., as part of a database or data sharing program), some combination thereof, and so forth. Other usage scenarios are also possible.

The task of a search result ranker is to assign a query-identifier pair a real-value score, which indicates the relevance of the identifier given the query. The score may be dependent upon a set of features that characterize the query-identifier pair. Although numerous other features may be used in different combinations and manners, the most widely used features currently include term frequency (TF) and inverse document frequency (IDF). Depending on how the relevance score is derived from the features, ranking models can be grouped into two categories: heuristic and learned.

The models in a first "heuristic" category assign a relevance score by combining the values of these features heuristically. For example, in one of the well-known variants of vector space models (VSM), the relevance score is defined as the product of the value of TF and the log of IDF. In contrast, the models in a second "learned" category map the features to a real-value with a mapping function that is learned using labeled training samples. The labeled training samples are a set of query-identifier pairs and their relevance judgments. Recent research indicates that the ranking models using a learned mapping function can significantly outperform the heuristic ranking models if a sufficiently large amount of training data is available. Accordingly, training data needs to be acquired for ranking models in the second learned category.

In the succeeding paragraphs, a particular example of learned ranking models is presented. The example ranking model is a neural net ranker that maps a feature vector x, which is extracted from a query-identifier pair, to a real y that indicates the relevance of the identifier to the query. The real-valued y is often termed the relevance score. For example, a linear neural net ranker maps x to y with a learned weight vector w such that y=w·x.

An example two-layer (nonlinear) neural net ranker may take the following form:

Input nodes: $x_i$;

Hidden nodes: $h_j$=tan h $(\Sigma_i w_{ji} x_i)$, where $w_{ji}$ is the weight from the i-th input node to the j-th hidden node; and Output node: o=tan h $(\Sigma_j w_j h_j)$, where $w_j$ is the weight from the j—the hidden node to the output node.

The weights vector w is learned from training samples (x, t)$_d$ in which x is the input feature vector from the query-identifier pair and t is the relevance score. Conventionally, the training relevance score t is assigned manually. This makes it infeasible to collect large amounts of recently-updated data just in time for model training. Because the distributions of web queries and the web itself, for example, change constantly, it is difficult to keep a web search engine up-to-date in as much as it is feasible to manually label only a relatively very small set of queries. As the scale of the web and users thereof grow seemingly exponentially, the lack of a large amount of updated training data can be a bottleneck to improving search performance.

Figure 2:
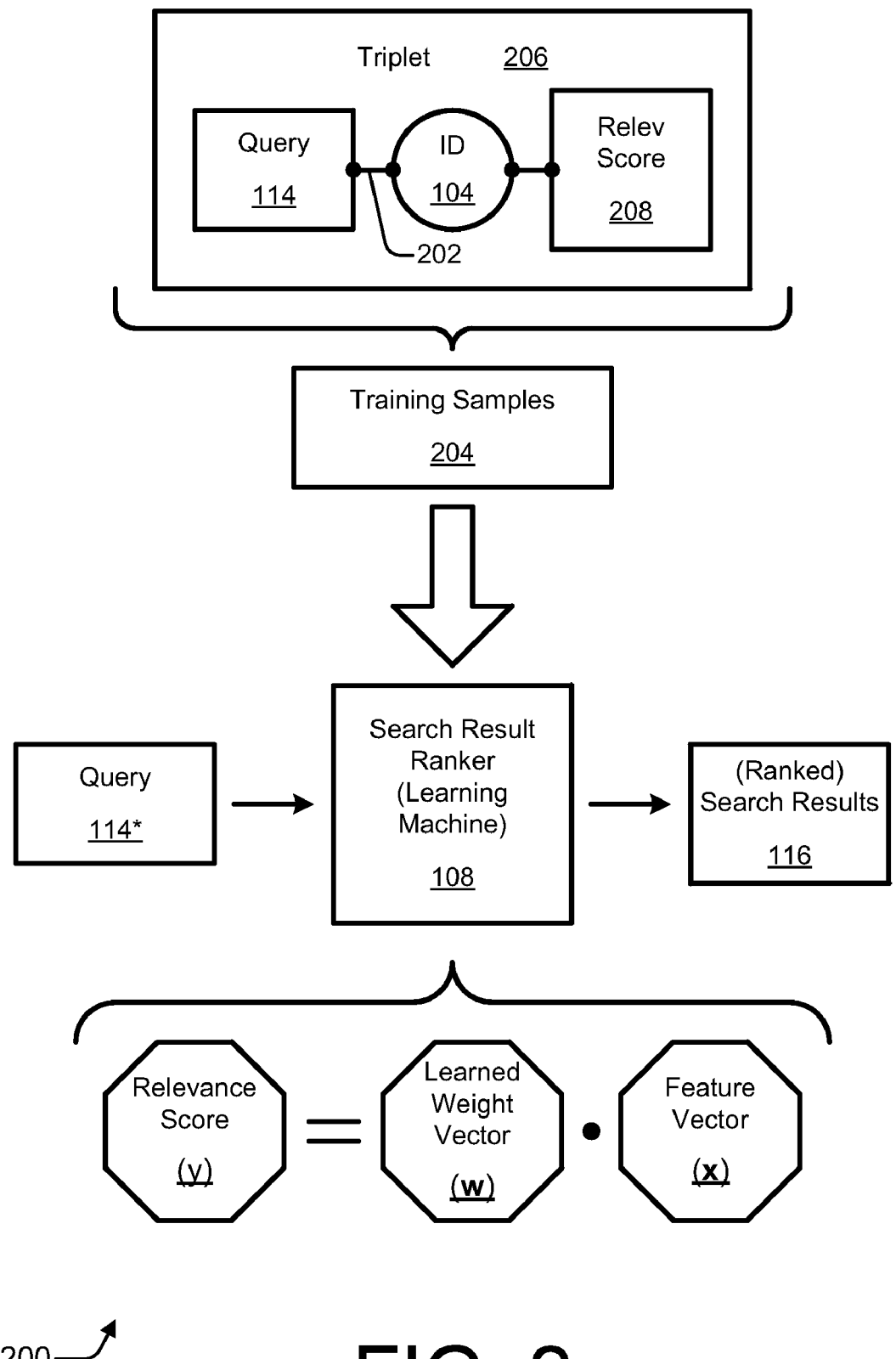
FIG. 2 depicts an example approach to the training of a search result ranker as a learning machine.

FIG. 2 depicts an example approach 200 to the training of a search result ranker 108 as a learning machine. As illustrated, approach 200 includes a query-identifier pair 202, training samples 204, and a query-identifier-relevance score triplet 206, which includes a relevance score 208. Approach 200 also includes an identifier 104, a query 114/114*, and search results 116. Query-identifier pair 202 is formed from a query 114 and a corresponding identifier 104. As is described herein below with particular reference to FIG. 3, relevance score 208 may be determined automatically by inferring relevance judgments from user interactions with search results. It should be noted that for the sake of clarity the ranker of approach 200 is illustrated as a one-layer (linear) neural net ranker.

For example embodiments, training samples 204 are submitted to search result ranker 108, which may comprise a learning machine. Search result ranker 108 is thus trained with training samples 204. Each training sample 204 is a query-identifier-relevance score triplet 206. Query-identifier-relevance score triplet 206 includes a query-identifier pair 202 and a relevance score 208. During the training, a weight vector (w) is learned from relevance scores (y) and feature vectors (x) of training samples 204. Specifically, relevance scores (y) correspond to relevance scores 208, and feature vectors (x) correspond to query-identifier pairs 202.

Once search result ranker 108 is at least partially trained with training samples 204, it may function to rank search results. In an example operation, query 114* is submitted to a search engine 106 (of FIG. 1). After search results are retrieved, search result ranker 108 is responsible for ranking them in accordance with its training. Search result ranker 108 then outputs search results 116 as ranked by relevance.

For popular large-scale web search engines, by way of example, billions of query sessions may be logged everyday. The resulting log data (e.g., query session logs) can provide an alternative to manually labeling data for the training of a learned ranking model. A relevance score can be assigned to a query-identifier pair using statistics derived from user interactions that are recorded to log data. For example, from user query-session log data in which for each query-identifier pair a count of user selections (e.g., clicks) is recorded, a relevance score may be inferred.

A query-session log is an example of log data. A query session log may include, for instance: (1) a user query and (2) a ranked list of retrieved identifiers, each with click information. Click information may include, for example, whether the identifier is selected (e.g., clicked) by the user and/or how much time the user focuses on the item corresponding to the identifier. This time period is often referred to in the search literature as the dwell time. The estimated relevance score, together with the query-identifier pair, can thus provide a training sample (x, t) for learning the ranking model.

Many different mechanisms may be used to estimate a relevance score for each query-identifier pair in log data by inferring user judgments from user interactions. Example mechanisms include, but are not limited to: click-through rate, dwell time, probability of being skipped, a combination thereof, and so forth. With regard to the probability of being skipped, such a mechanism measures by way of estimation the likelihood of the identifier being not selected (i.e., of being "skipped") by the user for a given query.

More specifically, for the probability of being skipped, a probability of the identifier being judged as irrelevant by the user is computed for each query-identifier pair in the query session. The probability thus measures the likelihood of the identifier being not clicked or "skipped" by the user. A value of [1—(the probability of being skipped)] can be considered the probability of the identifier being judged as relevant by the user. In other words, it can be considered a relevance score, or P(R|query-ID).

Thus, when there is a large amount of query session log data, it can be estimated for each query-identifier pair the probability that the identifier (and its corresponding item) is judged as relevant by users. When there are a sufficient number of query-identifier pair instances in the log data, a ranker can use the estimated P(R|query-ID) as the relevance score for ranking each query-identifier given the query. Such a ranker may also be updated as more log data is being accumulated. Relevance scores 208 (of FIGS. 2 and 3) may be probabilistic, non-probabilistic, normalized (e.g., to between 0 and 1), non-normalized, a combination thereof, and so forth.

Figure 3:
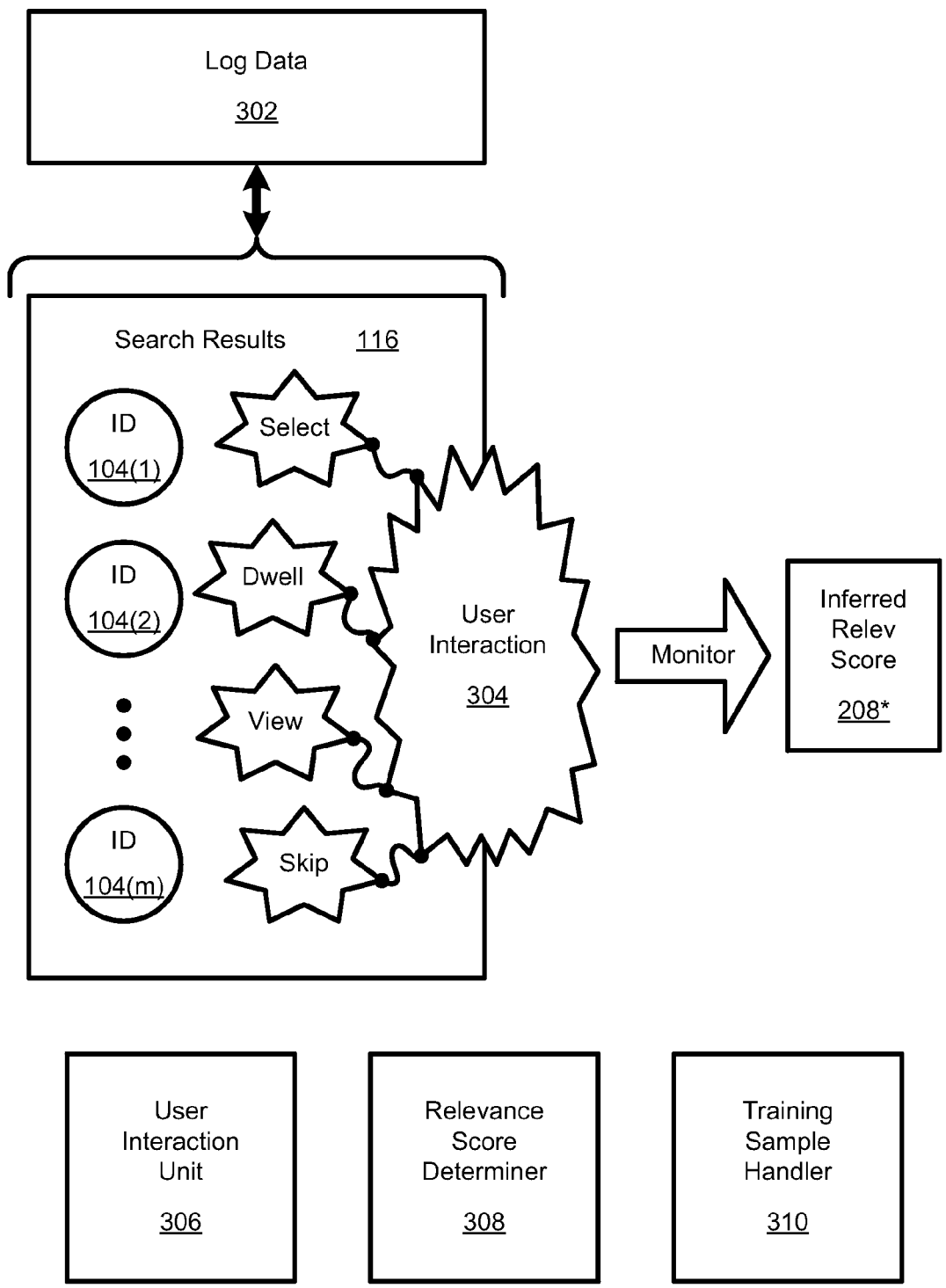
FIG. 3 is a block diagram illustrating an example scheme for using log data to determine a relevance score via inference from user interactions with search results.

FIG. 3 is a block diagram illustrating an example scheme 300 for using log data 302 to determine a relevance score 208* via inference from user interactions 304 with search results 116. As illustrated, scheme 300 includes log data 302, user interaction(s) 304, a user interaction unit 306, a relevance score determiner 308, and a training sample handler 310. Scheme 300 also depicts search results 116 and multiple identifiers 104(1), 104(2) . . . 104(m).

For example embodiments, log data 302 is derived from user interactions 304 with various search results 116. Each search results 116 includes a listing of identifiers 104. In such a search result listing, each identifier 104 may represent, instead of or in addition to an address type identifier, a title of the corresponding item, a snippet from the corresponding item, a combination thereof, and so forth.

Search results 116 are presented to a user and the user's interactions 304 are monitored. Example user interactions 304 include, but are not limited to: identifier selection, dwell time on an item corresponding to a selected identifier, viewing of an identifier of a search result, skipping an identifier of a search result, combinations thereof, and so forth. Thus, user interaction 304 can reflect user interaction with regard to query-identifier pairs for previous search results that are retained in a search history log. From user interactions 304, user interests are inferred and relevance scores 208* are determined. Each relevance score 208 may be determined using, by way of example but not limitation, one or more of the following mechanisms: click-through rate, average dwell time, probability of being skipped, some combination thereof, and so forth.

In an example embodiment, relevance score determiner 308 infers user interests from user interactions 304 with search results 115 for a particular query 114 and determines respective relevance scores 208 associated with respective query-identifier pairs 202 (of FIG. 2) of search results 116. Training sample handler 310 formulates query-identifier-relevance score triplets 206 from the respective relevance scores 208 associated with the respective query-identifier pairs 202. Training sample handler 310 also submits query-identifier-relevance score triplets 206 as training samples 204 to a learning machine. Search result ranker 108 is trained as the learning machine with multiple training samples 204 that comprise the query-identifier-relevance score triplets 206.

In an example implementation, user interaction unit 306 monitors user interactions 304 with query-identifier pairs 202 of search results 116 for the particular query 114 remotely by receiving information from an instrumented browser. An instrumented browser enables more details of user interaction 304 to be monitored and collected as part of log data 302. For example, more accurate dwell time may be collected.

In another example implementation, relevance score determiner 308 implicitly infers user interests from user interactions 304 automatically without manual label relevance input from users. In other words, users are not specifically asked to manually provide a relevance label (e.g., one to four stars) to a query-identifier pair 202 included as part of search results 116. In yet another example implementation, relevance score determiner 308 retrieves user interactions 304 from log data 302, such as one or more query session logs.

Figure 4:
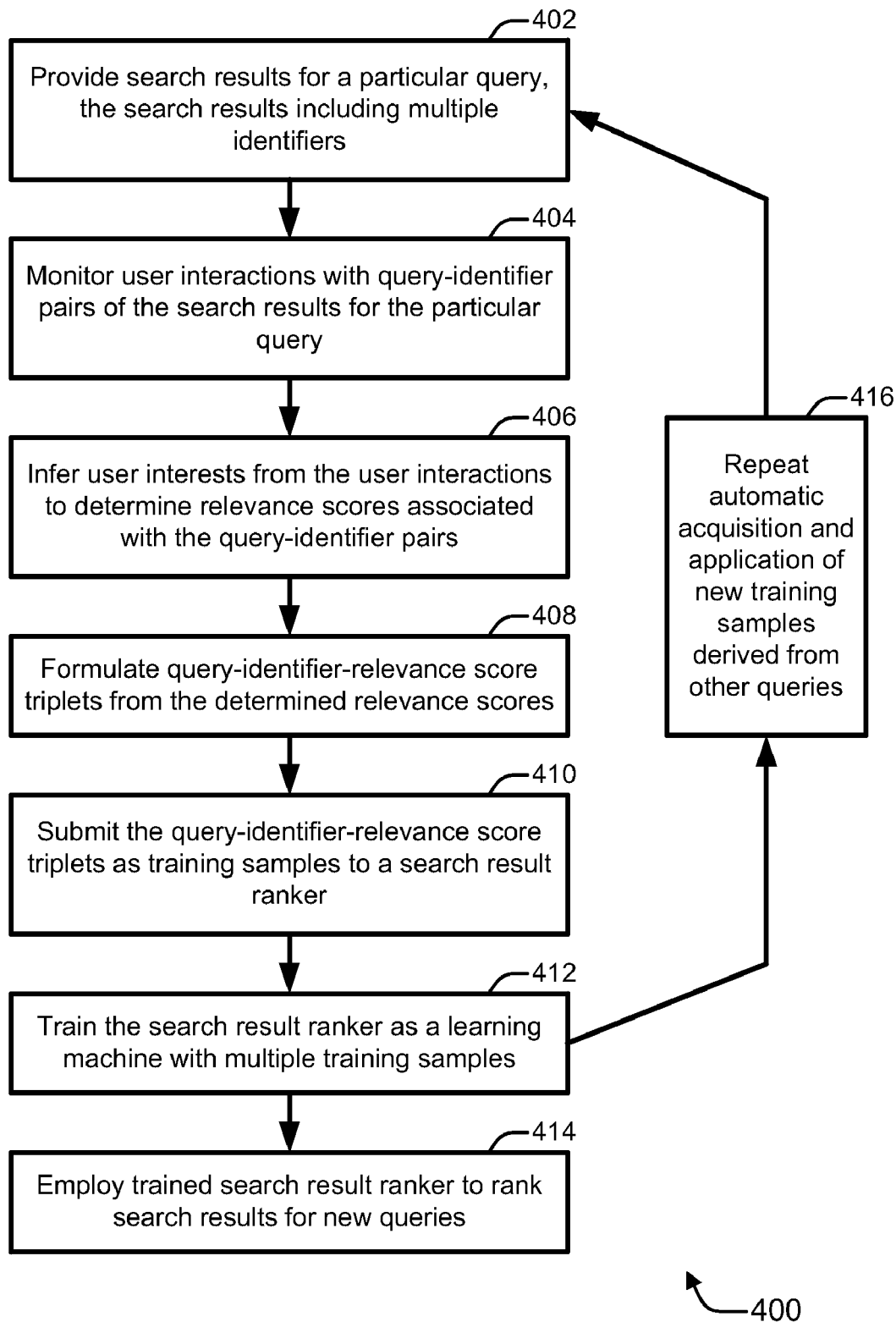
FIG. 4 is a flow diagram that illustrates an example of a method for training a search result ranker as a learning machine with automatically-generated samples.

FIG. 4 is a flow diagram 400 that illustrates an example of a method for training a search result ranker as a learning machine with automatically-generated samples. Flow diagram 400 includes eight blocks 402-416. Implementations of flow diagram 400 may be realized, for example, as processor-executable instructions and/or as part of search engine 106 (of FIG. 1), including at least partially by a search result ranker 108, a user interaction unit 306, a relevance score determiner 308, and/or a training sample handler 310 (of FIGS. 1, 2, and 3).

Figure 6:
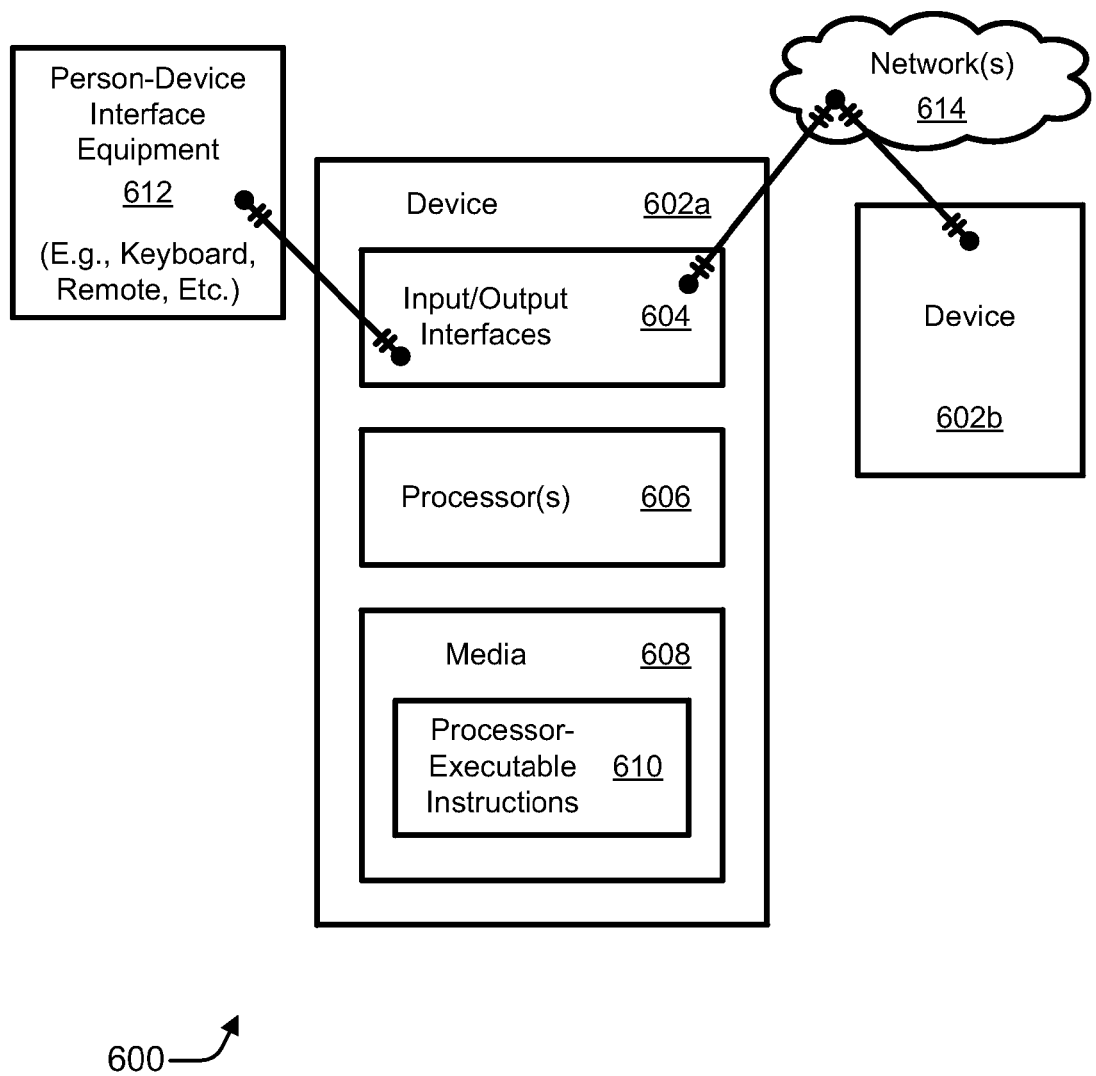
FIG. 6 is a block diagram illustrating example devices that may be used to implement embodiments for training a search result ranker with automatically-generated samples.

The acts of flow diagram 400 that are described herein may be performed in many different environments and with a variety of different systems, such as by one or more processing devices (e.g., of FIG. 6). The order in which the method is described is not intended to be construed as a limitation, and any number of the described blocks can be combined, augmented, rearranged, and/or omitted to implement a respective method, or an alternative method that is equivalent thereto.

For example embodiments, there is a system-implemented method for training a search result ranker as shown in flow diagram 400. It should be noted that for the sake of clarity the method is described in terms of a particular query. However, in practice multiple queries, including the particular query, may be addressed substantially simultaneously in a batch mode. At block 402, search results are provided for a particular query. The search results include multiple identifiers, which may be considered query-identifier pairs with regard to the particular query. At block 404, user interactions with query-identifier pairs of the search results for the particular query are monitored.

At block 406, user interests are inferred from the user interactions to determine respective relevance scores associated with respective query-identifier pairs. At block 408, query-identifier-relevance score triplets are formulated from the determined relevance scores and respective associated query-identifier pairs. At block 410, the query-identifier-relevance score triplets are submitted as training samples to a search result ranker. The search results ranker may be a learning machine.

At block 412, the search result ranker is trained as a learning machine with multiple training samples. At block 414, the trained search result ranker is employed to rank search results for new queries. At block 416, the automatic acquisition and application of new training samples that are derived from other queries is repeatedly performed. In other words, the acts of blocks 402-412 may be repeated to automatically train the search result ranker.

In an example implementation, the act of inferring includes automatically determining relevance scores from the user interactions without manual label relevance input from users (i.e., without explicitly asking users for a manual relevance label). In another example implementation, each identifier is a URL, the act of monitoring entails monitoring the user interactions with the query-identifier pairs remotely over the internet.

Additional example implementations are described herein below with particular reference to FIG. 5. For instance, the act of training may entail mathematically minimizing an error function that represents a current error level between determined relevance scores and relevance scores output by the learning machine. Also, the search result ranker may be a neural network (e.g., a two-layer neural network) that is trained by learning a weighting vector.

Figure 5:
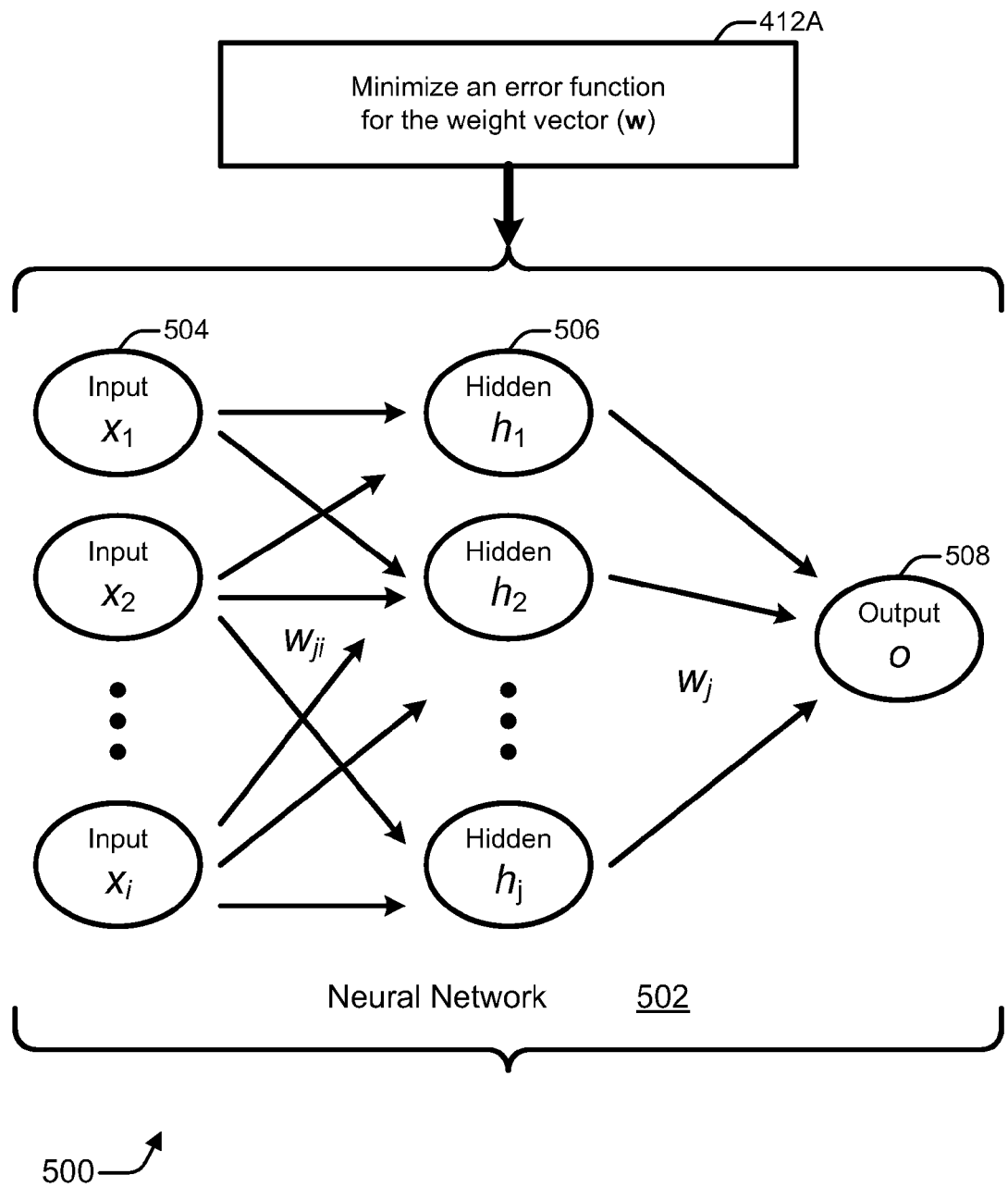
FIG. 5 illustrates an example training technique for a learning machine that is formed from a two-layer neural network.

FIG. 5 illustrates an example training technique 500 for a learning machine that is formed from a two-layer neural network 502. In an example embodiment, a search result ranker is trained at block 412A by mathematically minimizing an error function for the weight vector (w). For instance, neural network 502 may be trained as is described further below.

As illustrated, the two-layer neural network 502 includes multiple input nodes 504, multiple hidden nodes 506, and an output node 508. More specifically, "i" input nodes (504) $x_1$, $x_2 \ldots x_i$ are shown, with "i" representing a positive integer. Also shown are "j" hidden nodes (506) $h_1, h_2 \ldots h_j$, with "j" representing a positive integer. One output node (508) o is shown. The weights between input nodes 504 and hidden nodes 506 are denoted by $w_{ji}$. The weights between hidden nodes 506 an output node 508 are denoted by $w_j$.

The following provides a relatively quantitative example implementation. In this example, the relevance scores are probabilistic, the identifiers are URLs, and the search engine functions as a two-layer neural network. However, the principles described below in this example are also applicable to other implementations.

For this example implementation, it is given that there is a large number of training samples that have been generated from query logs. The training data is denoted as $(x, t)_d$, $d = 1, 2, \ldots$, where x is the feature vector representing a query-identifier pair, and t is the estimated relevance, e.g., P(R|ID, query). To illustrate an example optimization method, the two-layer neural net ranking model described above and illustrated in FIG. 5 is used as an example.

Thus, the example ranking model is parameterized by the weight vector w. The two-layer neural net ranker may take the following form:

Input nodes: $x_i$;

Hidden nodes: $h_j = \tanh(\Sigma_i w_{ji} x_i)$, where $w_{ji}$ is the weight from the i-th input node to the j-th hidden node; and Output node: $o = \tanh(\Sigma_j w_j h_j)$, where $w_j$ is the weight from the j—the hidden node to the output node.

To train the neural net ranker, the system searches for the "best" weight vector w that mathematically minimizes an error function E, as shown in Equation (1):

$$w^* = \arg\max_w E(w). \quad (1)$$

One of the most widely used error functions is the 2-norm loss function, the so-called minimum square error (MSE) loss. When, by way of example, this error function is used, Equation (2) results:

$$E(w) = \frac{1}{2} \sum_d (t_d - o_d)^2, \quad (2)$$

where $t_d$ is the estimated relevance score of the d-th training sample, and $o_d$ is the current output value of the neural net ranking model. Thus, a system may train a search result ranker, including but not limited to one with a neural network learning machine functionality, by at least reducing, if not minimizing, distances between (i) respective estimated relevance scores inferred by a relevance score determiner and (i) respective output values of the learning machine. It should be understood that other error functions may instead by used.

To mathematically optimize MSE, the standard stochastic gradient descent version of the Back Propagation algorithm may be used. In each iteration, and for each training sample (x, t), the weights w are updated by the following rules, where $\eta$ is the learning rate (e.g., $\eta = 0.001$):

For each weight from the j-th hidden node to the output node: $w_j = w_j + \eta \delta h_j$, where $\delta = (1-o^2)(t-o)$; and For each weight from the i-th input node to the j-th hidden node: $w_{ji} = w_{ji} + \eta \delta_j x_j$, where $\delta_j = (1-h_j^2) w_j \delta$.

The derivation of the two weight-update rules above is relatively straight forward. In many NLP applications, a relatively small fixed step size can be used instead of a step size that is in proportion to the error term $\delta$ and the input value ($x_i$ or $h_j$). Hence, the two weight-update rules above may be replaced with the following two rules, where sign (y)=+1 if y>0; -1 if y<0; and 0 otherwise.

For each weight from the j-th hidden node to the output node: $w_j = w_j + \eta \text{sign}(\delta h_j)$; and For each weight from the i-th input node to the j-th hidden node: $w_{ji} = w_{ji} + \eta \text{sign}(\delta_j x_j)$.

FIG. 6 is a block diagram 600 illustrating example devices 602 that may be used to implement embodiments for training a search result ranker with automatically-generated samples. As illustrated, block diagram 600 includes two devices 602a and 602b, person-device interface equipment 612, and one or more network(s) 614. As explicitly shown with device 602a, each device 602 may include one or more input/output interfaces 604, at least one processor 606, and one or more media 608. Media 608 may include processor-executable instructions 610.

A search-related system generally may be formed from one or more devices 602. With reference to the usage scenarios described above (e.g., in the context of FIG. 1) and by way of example only, a server device may be realized with device 602a, and a client device may be realized with device 602b. Intervening network(s) may correspond to network(s) 614. It should be noted that systems and/or devices for training search result rankers as described herein may be localized or distributed (e.g., over one or more server farms and/or data centers). Thus, but by way of example only, any of search result ranker 108, user interaction unit 306, relevance score determiner 308, and/or training sample handler 310 may be located at different geographic locations and/or machines.

For example embodiments, device 602 may represent any processing-capable device. Example devices 602 include personal or server computers, hand-held or other portable electronics, entertainment appliances, network components, data storage components, some combination thereof, and so forth. Device 602a and device 602b may communicate over network(s) 614. Network(s) 614 may be, by way of example but not limitation, an internet, an intranet, an Ethernet, a public network, a private network, a cable network, a digital subscriber line (DSL) network, a telephone network, a wireless network, some combination thereof, and so forth. Person-device interface equipment 612 may be a keyboard/keypad, a touch screen, a remote, a mouse or other graphical pointing device, a display screen, a speaker, and so forth. Person-device interface equipment 612 may be integrated with or separate from device 602a.

I/O interfaces 604 may include (i) a network interface for monitoring and/or communicating across network 614, (ii) a display device interface for displaying information on a display screen, (iii) one or more person-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) person-device interfaces include those that communicate by wire or wirelessly to person-device interface equipment 612. A given interface may function as both a display device interface and a person-device interface.

Processor 606 may be implemented using any applicable processing-capable technology, and one may be realized as a general-purpose or a special-purpose processor. Examples include a central processing unit (CPU), a microprocessor, a controller, a graphics processing unit (GPU), a derivative or combination thereof, and so forth. Media 608 may be any available media that is included as part of and/or is accessible by device 602. It includes volatile and non-volatile media, removable and non-removable media, storage and transmission media (e.g., wireless or wired communication channels), hard-coded logic media, combinations thereof, and so forth. Media 608 is tangible media when it is embodied as a manufacture and/or as a composition of matter.

Generally, processor 606 is capable of executing, performing, and/or otherwise effectuating processor-executable instructions, such as processor-executable instructions 610. Media 608 is comprised of one or more processor-accessible media. In other words, media 608 may include processor-executable instructions 610 that are executable by processor 606 to effectuate the performance of functions by device 602. Processor-executable instructions 610 may be embodied as software, firmware, hardware, fixed logic circuitry, some combination thereof, and so forth.

Thus, realizations for training a search result ranker with automatically-generated samples may be described in the general context of processor-executable instructions. Processor-executable instructions may include routines, programs, applications, coding, modules, protocols, objects, components, metadata and definitions thereof, data structures, APIs, etc. that perform and/or enable particular tasks and/or implement particular abstract data types. Processor-executable instructions may be located in separate storage media, executed by different processors, and/or propagated over or extant on various transmission media.

As specifically illustrated, media 608 comprises at least processor-executable instructions 610. Processor-executable instructions 610 may comprise, for example, any of search result ranker 108, user interaction unit 306, relevance score determiner 308, and/or training sample handler 310 (of FIGS. 1, 2, and 3). Generally, processor-executable instructions 610, when executed by processor 606, enable device 602 to perform the various functions that are described herein. Such functions include, by way of example, those that are illustrated in flow diagram 400 (of FIG. 4) and those pertaining to features illustrated in the various block diagrams, as well as combinations thereof, and so forth.

The devices, acts, features, functions, methods, modules, data structures, techniques, components, etc. of FIGS. 1-6 are illustrated in diagrams that are divided into multiple blocks and other elements. However, the order, interconnections, interrelationships, layout, etc. in which FIGS. 1-6 are described and/or shown are not intended to be construed as a limitation, and any number of the blocks and/or other elements can be modified, combined, rearranged, augmented, omitted, etc. in many manners to implement one or more systems, methods, devices, media, apparatuses, arrangements, etc. for training a search result ranker with automatically-generated samples.

Although systems, methods, devices, media, apparatuses, arrangements, and other example embodiments have been described in language specific to structural, logical, algorithmic, and/or functional features, it is to be understood that the invention defined in the appended claims is not necessarily limited to the specific features or acts described above. Rather, the specific features and acts described above are disclosed as example forms of implementing the claimed invention.

What is claimed is:

1. One or more processor-accessible tangible media comprising processor-executable instructions for training a search result ranker, wherein the processor-executable instructions, when executed, direct a system to perform acts comprising:
    inferring user interests from user interactions with search results for a particular query, the search results including identifiers that comprise uniform resource locators (URLs);
    determining respective relevance scores associated with respective query-identifier pairs of the search results, each respective relevance score comprising a respective probability of the respective identifier being skipped by a user;
    formulating query-identifier-relevance score triplets from the respective relevance scores associated with the respective query-identifier pairs;
    submitting the query-identifier-relevance score triplets as training samples to a search result ranker; and
    training the search result ranker as a learning machine with multiple training samples comprising the query-identifier-relevance score triplets.

2. The one or more processor-accessible tangible media as recited in claim 1, wherein the user interactions comprise one or more of: identifier selection, dwell time on an item corresponding to a selected identifier, viewing of an identifier of a search result, or skipping an identifier of a search result.

3. The one or more processor-accessible tangible media as recited in claim 1, wherein the acts of inferring and determining comprise:
    automatically determining relevance scores from the user interactions without manual label relevance input from users.

4. A method implemented by a system for training a search result ranker, the method comprising acts of:
    inferring user interests from user interactions with search results for a particular query to determine respective relevance scores associated with respective query-identifier pairs of the search results;
    formulating query-identifier-relevance score triplets from the respective relevance scores associated with the respective query-identifier pairs;
    submitting the query-identifier-relevance score triplets as training samples to a search result ranker; and
    training the search result ranker as a learning machine with multiple training samples comprising the query-identifier-relevance score triplets.

5. The method as recited in claim 4, further comprising:
    employing the trained search result ranker to rank different search results for new queries.

6. The method as recited in claim 4, further comprising:
    repeatedly acquiring and applying new training samples derived from other queries to automatically train the search result ranker.

7. The method as recited in claim 4, wherein the act of inferring comprises:
    automatically determining relevance scores from the user interactions without manual label relevance input from users.

8. The method as recited in claim 4, further comprising:
    providing the search results for the particular query, the search results including multiple query-identifier pairs; and
    monitoring the user interactions with the query-identifier pairs of the search results for the particular query.

9. The method as recited in claim 4, wherein the user interactions comprise one or more of: identifier selection, dwell time on an item corresponding to a selected identifier, viewing of an identifier of a search result, or skipping an identifier of a search result.

10. The method as recited in claim 4, wherein the relevance scores comprise one or more of: click-through rate, average dwell time, or probability of being skipped.

11. The method as recited in claim 4, wherein each identifier comprises a uniform resource locator (URL); and wherein the method further comprises:
    monitoring the user interactions with the query-identifier pairs of the search results remotely over an internet.

12. The method as recited in claim 4, wherein the act of training comprises:
    mathematically minimizing an error function that represents a current error level between determined relevance scores and relevance scores output by the learning machine.

13. The method as recited in claim 4, wherein the search result ranker comprises a neural network.

14. A system that is capable of training a search result ranker, the system comprising:
    a relevance score determiner to infer user interests from user interactions with search results for a particular query and to determine respective relevance scores associated with respective query-identifier pairs of the search results;
    a training sample handler to formulate query-identifier-relevance score triplets from the respective relevance scores associated with the respective query-identifier pairs and to submit the query-identifier-relevance score triplets as training samples to a learning machine; and
    a search result ranker to be trained as the learning machine with multiple training samples comprising the query-identifier-relevance score triplets.

15. The system as recited in claim 14, further comprising:
a user interaction unit to monitor the user interactions with the query-identifier pairs of the search results for the particular query remotely by receiving information from an instrumented browser.

16. The system as recited in claim 14, wherein the search result ranker comprises a two-layer neural network.

17. The system as recited in claim 14, wherein the system is to train the search result ranker by learning a weighting vector.

18. The system as recited in claim 17, wherein the system is to train the search result ranker by at least reducing distances between (i) respective estimated relevance scores inferred by the relevance score determiner and (i) respective output values of the learning machine.

19. The system as recited in claim 14, wherein the relevance score determiner is further to implicitly infer the user interests from the user interactions automatically without manual label relevance input from users.

20. The system as recited in claim 14, wherein the relevance score determiner is further to retrieve the user interactions from one or more query session logs.

* * * * *